United States Patent

Linnhoff

[11] Patent Number: 5,452,831
[45] Date of Patent: Sep. 26, 1995

[54] ROOF RACK FOR VEHICLES

[75] Inventor: Jürgen Linnhoff, Ingolstadt, Germany

[73] Assignee: Votex GmbH, Dreieich, Germany

[21] Appl. No.: 204,321

[22] PCT Filed: Jul. 8, 1993

[86] PCT No.: PCT/EP93/01785
§ 371 Date: Mar. 7, 1994
§ 102(e) Date: Mar. 7, 1994

[87] PCT Pub. No.: WO94/01303
PCT Pub. Date: Jan. 20, 1994

[30] Foreign Application Priority Data

Jul. 9, 1992 [DE] Germany .......... 42 22 494.2

[51] Int. Cl.[6] .................................... B60R 9/04
[52] U.S. Cl. .................. 224/329; 224/320; 224/321; 224/326
[58] Field of Search .................... 224/309, 310, 224/315, 314, 316, 318, 319, 320, 321, 322, 323, 325, 327, 329, 330, 331, 917

[56] References Cited

U.S. PATENT DOCUMENTS

| 3,223,301 | 5/1962 | Helm | 224/326 |
| 4,684,049 | 8/1987 | Maby et al. | 224/320 |
| 4,815,643 | 3/1989 | Heidemann | 224/321 |
| 5,071,050 | 12/1991 | Pudney et la. | 224/321 |
| 5,104,020 | 4/1992 | Arvidsson et al. | 224/329 |

FOREIGN PATENT DOCUMENTS

| 3405357 | 8/1985 | Germany . | |
| 3607856 | 9/1987 | Germany . | |
| 3614747 | 11/1987 | Germany . | |
| 9400315 | 6/1992 | Sweden | 224/329 |

Primary Examiner—Henry J. Recla
Assistant Examiner—Timothy L. Maust
Attorney, Agent, or Firm—Collard & Roe

[57] ABSTRACT

In a vehicle roof rack that has an elongate frame fastened at each end to a support base, a joint is provided between each support base and the frame so that the base can be moved laterally relative to the longitudinal direction of the frame.

10 Claims, 1 Drawing Sheet

ROOF RACK FOR VEHICLES

The invention relates to a roof rack for a vehicle.

With known roof racks, the rack support parts are rigidly connected with the frame of the rack. When the roof rack is mounted on the roof of the vehicle, it cannot be avoided in most cases that the longitudinal direction of the frame of the rack is not exactly disposed perpendicular to the longitudinal direction of the vehicle. Particularly in connection with the roof configurations of modern passenger motor vehicles, which are styled aerodynamically with roof edges that are curved convex, no clearly determinable reference line exists for correctly mounting the roof rack. Since the rack support parts are tightened in most cases either on the rain gutter or on mounting abutments of the vehicle in areas that are relatively long in the longitudinal direction of the vehicle, strong distortions arise within the zone of connection between the frame of the rack and the rack support parts with inexact alignment of the roof rack and/or due to the slightly slanted support areas on the roof. With longer use, this may lead to undesirable deformations. Furthermore, the seating of the roof rack on the roof is unsatisfactory for introducing high loads or strong forces of acceleration or deceleration. Noises may be caused during operation by the distortions resulting when the rack support parts are tightened. The areas of connection between the rack support parts and the frame of the rack and the retaining elements in the rack support part are stressed to an undesirably high degree and may wear out.

The invention has the object of creating a roof rack of the type specified above that is manufacturable in a simple and low-cost way, and which, in the mounted condition, is fixed stable without the parasitary distortions conditioned by the mounting. It is to be readily adaptable to the form of the roof without the roof rack losing its stable form. Furthermore, the roof rack according to the invention is to be characterized by convenient handling and safe protection of the mounting elements against theft of the roof rack.

The above objects are achieved as follows.

With said design, the rack support part alone is capable of aligning itself during mounting relative to the rack bar in such a way that any inexact placement of the roof rack on the roof of the vehicle and/or support areas of the vehicle roof not extending exactly perpendicular to the longitudinal direction of the rack bar are compensated in such a way that each rack support part finds a correct and permanently fixed seating on the roof of the vehicle, and that deformations or distortions in the roof rack caused by the mounting are avoided. The rack support part, owing to the mobility in the joint during mounting and tightening, automatically finds its correct position in the support areas on the roof. It is obvious that provision is made for such a joint for each rack support part even with a roof rack in which not only two rack support parts are connected with each other via one support bar in each case, but also where a frame-like support bar design has four or six rack support parts. With such roof racks, too, it is advantageous if each rack support part is movable relative to the support bar construction, so that a safe support is obtained during mounting. It has to be particularly stressed in this connection that the entire rack support part, which also comprises the support part on the roof, adjusts itself relative to the rack bar. With this construction, the static loads, and also the forces caused by decalstations or accelerations of the vehicle are safely transmitted via the axle of the joint, which permits the rack support part to swivel in a plane vertical relative to the axle of the joint.

The construction according to another embodiment results in a spatial range of swivel for the rack support part that is useful in connection with the roof shapes of modern vehicles, which in most cases extend highly arched and curved along the edges.

A useful design is disclosed by a further embodiment. This degree of freedom, which permits the rack support part to swivel in the joint at least to each side of the rack bar, suffices in practical life for nearly all existing roof rack and roof shapes to avoid undesirable distortions, deformations or an unstable seating of the tightened rack support part, whereby the stable and solid design of the rack bar is not lost.

The range of swivel according to another embodiment suffices in practical life in order to exclude unfavorable distortions or deformations or unstable support conditions of the rack support part.

With the construction according to a further embodiment, the joint connects the rack support part not directly with the rack bar but with the stationary connection part projecting from the rack bar downwardly. This is a construction that it is useful for modern roof racks that are fitted closely to the curved roof of the vehicle. Most of all, with this design, the rack bar remains in a rigid unit with the connection part, and only the articulated rack support part aligns itself with the sloped surface of the roof.

The safety of correct load transmission from the rack bar to the rack support part is assured with the design according to another embodiment, which results in high stability of the correctly mounted roof rack. In this way, the loads are transmitted across a large area. The joint and the individual components in the further connection are subjected to only moderate local stresses, which, furthermore, are exactly predetermined.

With the construction according to a further embodiment, a type of three-point support exists between the rack support part and the rack bar, whereby the Joint axle is one point of the three-point support, whereas the two other corner points of the three-point support are movable to a limited extent only in the direction of swivel, but effect a rigid connection in all other directions.

Any undesirable stealing of the roof rack from the vehicle is prevented in connection with the design according to a further embodiment in spite of the intended swivel-mounting of the rack support part because the closed cover flap blocks the access to the components permitting removal. Moreover, this results in a protection against environmental influences for these components of the roof rack, which often have to be actuated only after long time intervals. The cover flap is mounted on the rack bar, so that it does not follow any swivel motion of the rack support part but rather offers a fixed unit with the rack bar. The cover flap is locked by means of the swivel bolt and can be opened only if the swivel bolt is released and moved in the correct way.

The cover flap is additionally secured and supported in the non-locked but closed condition with the construction according to a further embodiment.

The design according to another embodiment is simple in its construction because the one and same element is used for the closing and locking of the cover flap.

Furthermore, the construction according to a further embodiment is particularly advantageous in that a high degree of safety against unauthorized opening of the cover flap is achieved in a way that is particularly simple in terms of construction and favorable in terms of installation.

BRIEF DESCRIPTION OF THE DRAWINGS

The object of the invention is explained in the following on a design shown in the drawing, in which.

DETAILED DESCRIPTION OF PREFERRED EMBODIMENT

Figure 1:
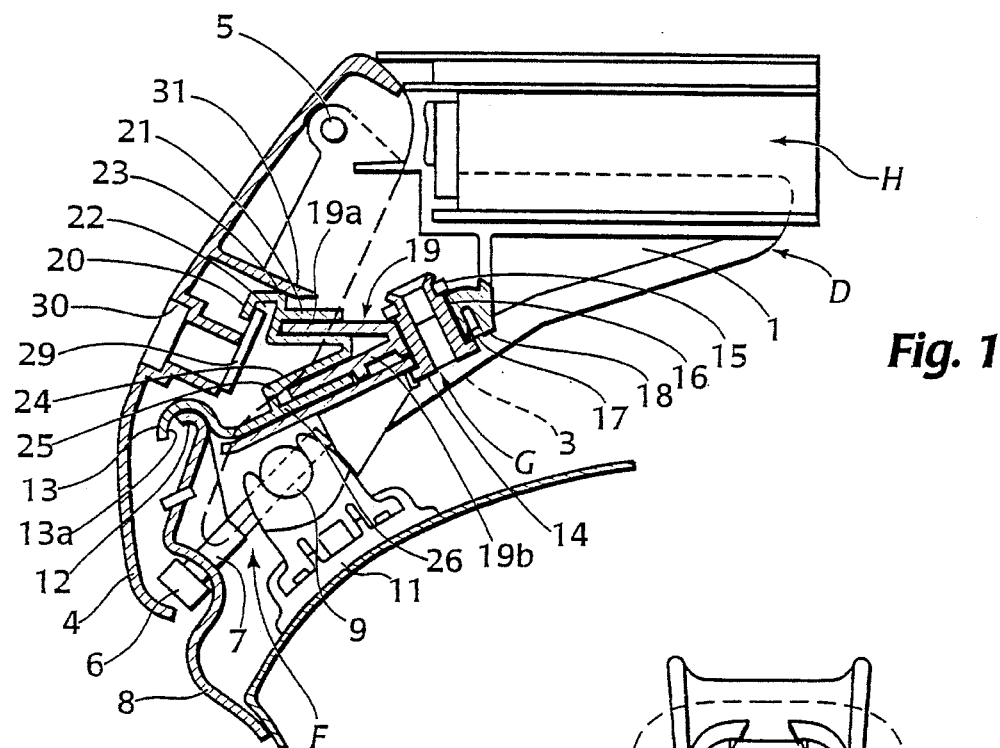
FIG. 1 shows a vertical section through an end zone of a roof rack.

FIG. 1 shows an end zone of an elongated rack bar H with a rack support part F fastened thereon, of a roof rack D as it is intended for mounting on a vehicle roof A, in particular on the roof of a passenger motor vehicle. The rack support part F is intended for mounting on a roof A, on which not necessarily a rain gutter is used as the support area, but where provision is made for a support area which is constructionally integrated in the roof or in the transition leading to the side surfaces of the body, with a tightening tab 8 engaging said support area, said tab being pressed against the surface of the roof by a support cushion 11, which is mounted articulately on the rack support part F. However, it is entirely possible also to fit the rack support part F in the previously customary manner with clamping elements, which are clamped on the rain gutter of the vehicle roof A and which do not require a support cushion 11.

From the end zone of the rack bar H, a console-like connection part 1 projects downwardly. The rack support part F is connected with the connection part I via a joint G in such a way that the rack support part F (see FIG. 2) can be swivelled around a joint axle 3 to both sides relative to the longitudinal direction of the rack bar H laterally. In this connection, a swivel range of 3° in the direction of either side suffices in practical life. The Joint axle 3 is disposed in a vertical plane defined by the rack bar H and the rack support part F in approximately the center plane of the rack support part F and set slanted against the longitudinal direction of the rack bar H in such a way that it is disposed approximately vertical relative to the direction of expanse of the connection part 1.

A cover flap 4 is arranged on the connection part 1 and can be pivoted around a transverse axle 5, which is disposed high. As explained hereinafter, the cover flap 4 is securable on the connection part 1, and additionally lockable. It covers the components of the rack support part F which have to be actuated for mounting or removal.

A head 6 of a clamping screw 7 is disposed in a depression of the tightening tab 8, said clamping screw being screwed into a rotatable abutment 9 in a bearing block 10 on the underside, the latter being fixed with the joint G, On the bearing block 10, the support cushion 11 is supported in a suspension swinging around the abutment 9, so that it is capable of adapting itself with its underside to the contour of the roof. The tightening tab 8 engages with its upper, bent end 12 and fillet 13a of a support 13.

In the embodiment shown, provision is made in the joint G for a metal sleeve 14, which is widened at both ends and extends through the bores 16, 17 in the connection part 1 and in the base plate 18 of the bearing block 10, the latter being part of the rack support part F. Said metal sleeve 14 may be also a bolt made of plastic or some other material, and fixes the center of rotation for the rack support part F. A washer 15 assures the swivelling of the rack support part F together with the base plate 18 around the joint axle 3, whereby the base plate 18 rotates against the connection part 1. A support 13, which is discussed hereinafter in greater detail, is fixed on the base plate 18. The connection part 1 is extended beyond the joint G and forms there an end section 19 opening in the form of a V with the two diverging legs 19a and 19b. For reasons of production engineering, a one-piece element 20 is fixed on the end section 19, said element having a plug leg 21 plugged over the leg 19a and having an undercut lock trap 22, and a counter arrest 23 on the outer side. For locking purposes, a mounted leg 24 of the element 20, said leg extending along the other leg 19b, engages with its thickened end 25 and deepening 26 in the leg 19b.

Figure 2:
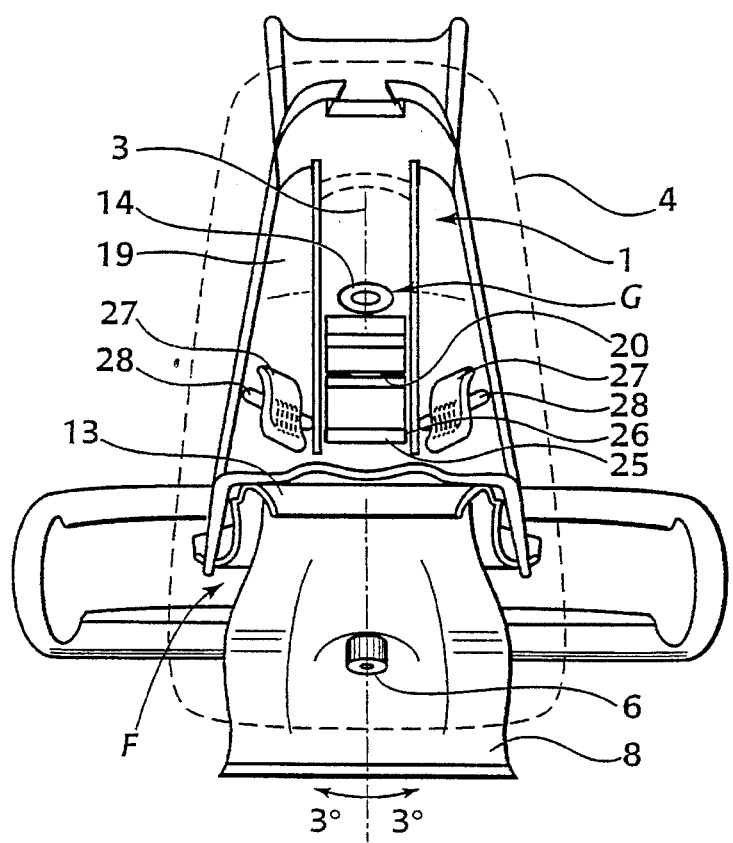
FIG. 2 shows a top view of the rack support part of the roof rack of FIG. 1, omitting a few components.

FIG. 2 shows that in addition to the joint G, provision is made for a further connection between the rack support part F and the connection part 1 with a spacing from the joint axle 3, by which connection the range of swivel of the rack support part P around the joint axle 3 is limited, on the one hand, and stresses transmitted from the rack bar H into the rack support part P are absorbed, on the other hand. Said further connection consists of the two holding claws 27, which are attached to the support 13 and grip through the slots 28 of the end section 19 and across the top side of the leg 19b of the end section 1. The holding claws 27 are seated in the slots 28 with swivel play. The support 13 is assembled with the base plate 18 to one unit and, together with the attached holding claws 27, forms the essential part for the swinging of the rack support part F.

A locking cylinder that can be actuated, for example by means of a key, can be accommodated in a bore 30 of the cover flap 4, said cylinder serving for turning a swivel bolt 29 which, in Pig. 1, engages in its locking position the lock trap 22 of the element 20. An elastic arrester nose 31 is shaped by molding on the underside of the cover flap 4, a nose, which the locking position of the cover flap 4 according to Pig. 1, grips behind the counter arrest 23 of the element 20.

When the roof rack D is mounted, it is placed on the vehicle roof A, whereby the two rack support parts F are aligned with their clamping tabs 8 with the fastening areas on the roof. Due to the mobility in the joint G, each rack support part F aligns itself irrespective of the direction of the rack bar H in such a way that the tightening tab 8 engages correctly. The roof rack D is clamped tight by tightening of the clamping screw 7. The support cushion 11 places itself on the surface of the roof, so that each rack support F is finally properly clamped tight by its tightening tab 8 and the support cushion 11.

I claim:

1. Roof rack for a vehicle having a roof comprising an elongated rack bar transversely across the vehicle and said bar having two end zones;

a rack support part supporting itself on the roof of the vehicle fastened on each of the two end zones of said bar, said rack support part having a clamping tab engaging an edge of the roof;

a joint having a joint axle between each of the rack support part and the rack bar in order to swivel the rack support part in the joint at least relative to a longitudinal direction of the rack bar to each side in a plane perpendicular to the joint axle; and the joint axle pointing to the vehicle roof and being aligned with an acute angle (e) relative to the longitudinal direction of the rack bar.

2. Roof rack for a vehicle having a roof comprising an elongated rack bar transversely across the vehicle and said bar having two end zones;

a rack support part supporting itself on the roof of the vehicle fastened on each of the two end zones of said bar, said support part having a clamping tab engaging an edge of the roof;

a joint having a joint axle between each of the rack support part and the rack bar in order to swivel the rack support part in the joint axle at least relative to a longitudinal direction of the rack bar to each side in a plane perpendicular to the joint axle, the joint axle pointing to the vehicle roof and being aligned with an acute angle ($\alpha$) relative to the longitudinal direction of the rack bar; and wherein the acute angle ($\alpha$) between the joint axle and the longitudinal direction of the rack bar ranges between about 50° to 70°.

3. Roof rack according to claim 2, wherein the rack support part is swingable around the joint by approximately 3° to each side relative to the longitudinal direction of the rack bar.

4. Roof rack according to claim 2, wherein said rack bar has an end, and wherein said joint has a connection part attached to the end of the rack bar and projects sloped downwardly and outwardly, said joint articulately supporting the rack support part.

5. Roof rack according to claim 2, further comprising at least one additional connection between the rack support part and the connection part, and that the additional connection is designed with joint play around the joint axle.

6. Roof rack according to claim 2, wherein the joint has a center, and said center of the joint is formed by a bolt in a sleeve and widened at both ends of said bolt;

the connection part grips over the support part with an end section extended beyond the joint;

two holding claws on the support part grip through slots of the end section and across the top side of the end section; and the holding claws and the slots are approximately concentric relative to the joint axle.

7. Roof rack according to claim 2, further comprising a lockable cover flap gripping over the joint and mounting elements of the rack support part and being articulated on an end section of the rack bar;

said cover flap retaining its covering position irrespective of the swivel motion of the support part; and a locking bolt on the underside of the cover flap for gripping in a locking position behind a lock trap supported on the end section.

8. Roof rack according to claim 7, further comprising an elastic arrester nose arranged on the underside of the cover flap, said nose gripping in the locking position of the cover flap over a counter arrest on the end section.

9. Roof rack according to claim 8, wherein the lock trap and the counter arrest are arranged on a one-piece element, said one-piece element being plugged into a V-shaped receiver formed by the end section and locked therein.

10. Roof rack according to claim 9, wherein the one-piece element has a plug leg supporting the lock trap and the counter arrest;

said plug leg being plugged over a first bridge of the end section, said bridge being aligned deviating from the direction of swivel of the cover flap by the articulation in the end zone of the rack bar; and said one-piece element has a second leg locked with its end in a depression of a second bridge.

* * * * *